United States Patent Office 2,997,266
Patented Aug. 22, 1961

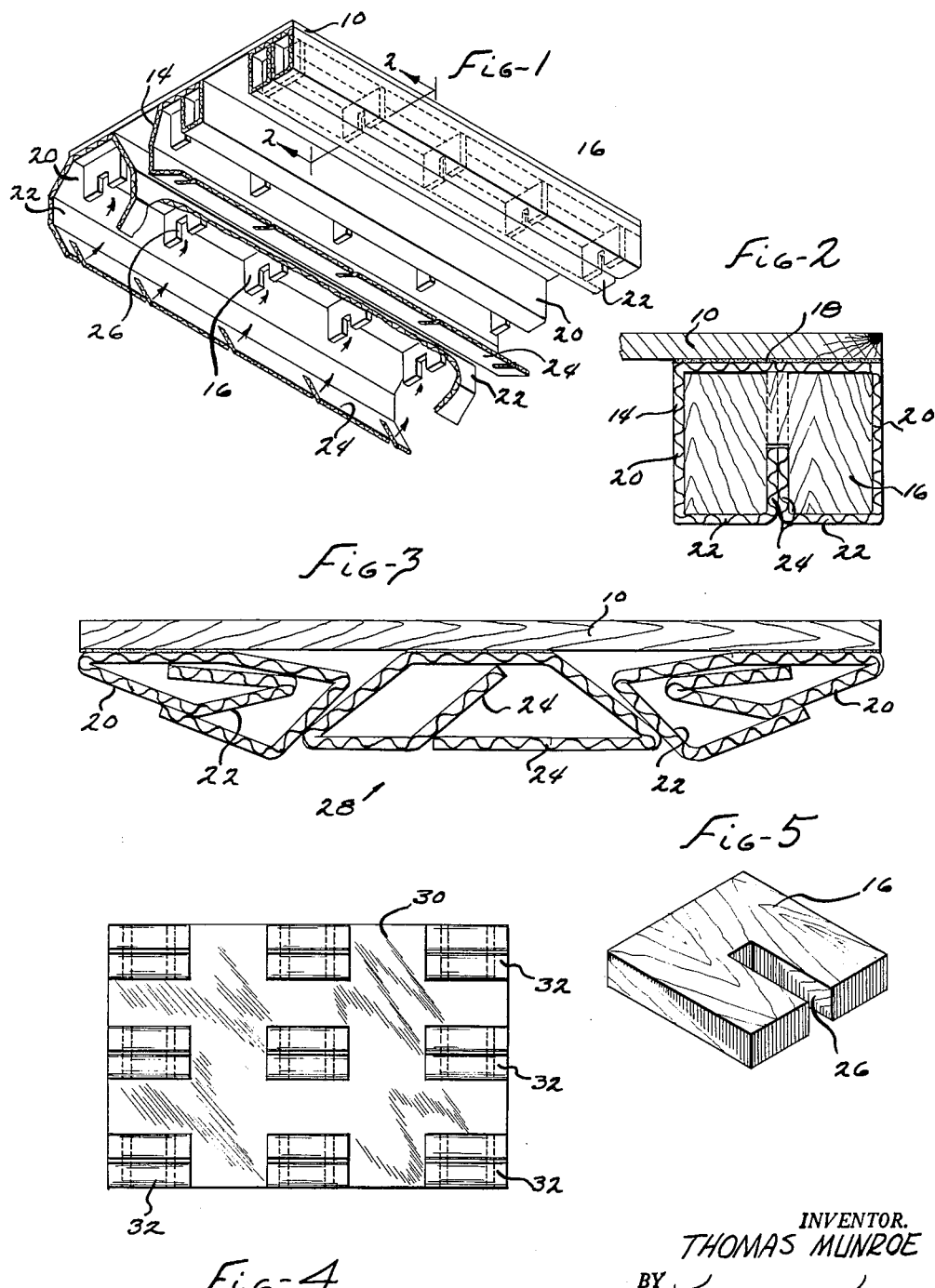

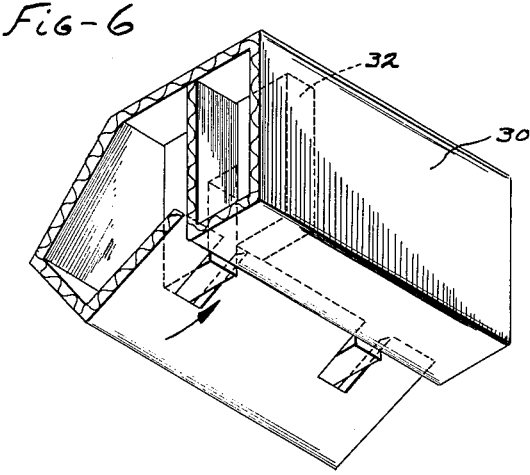
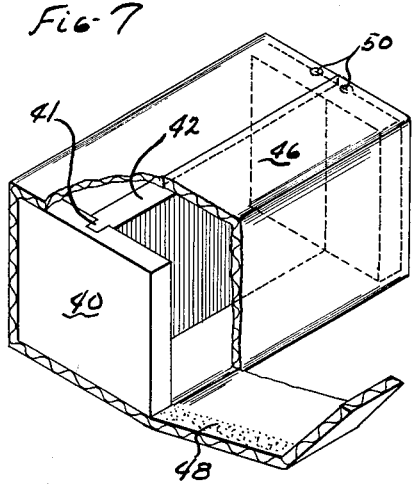
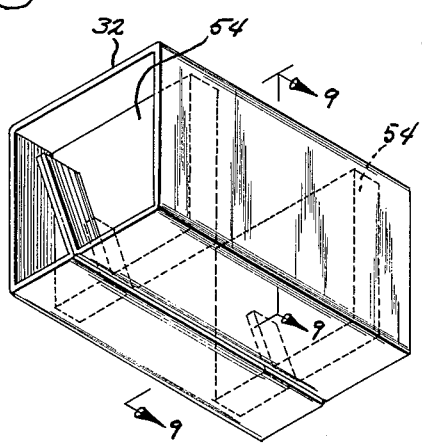
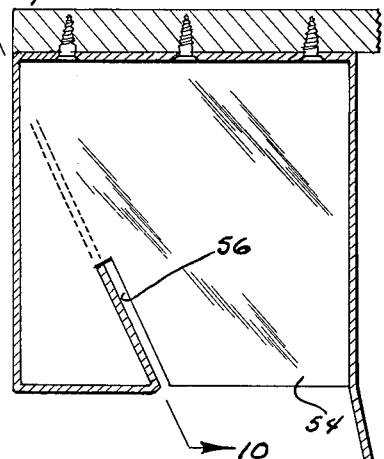
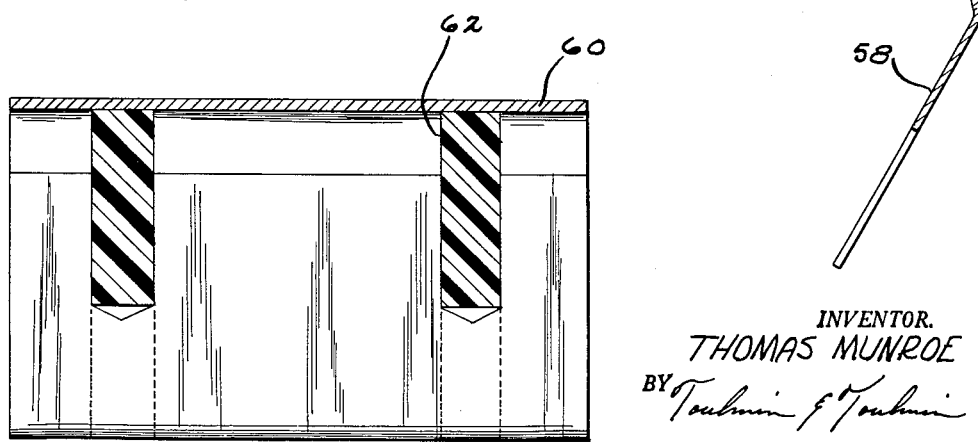

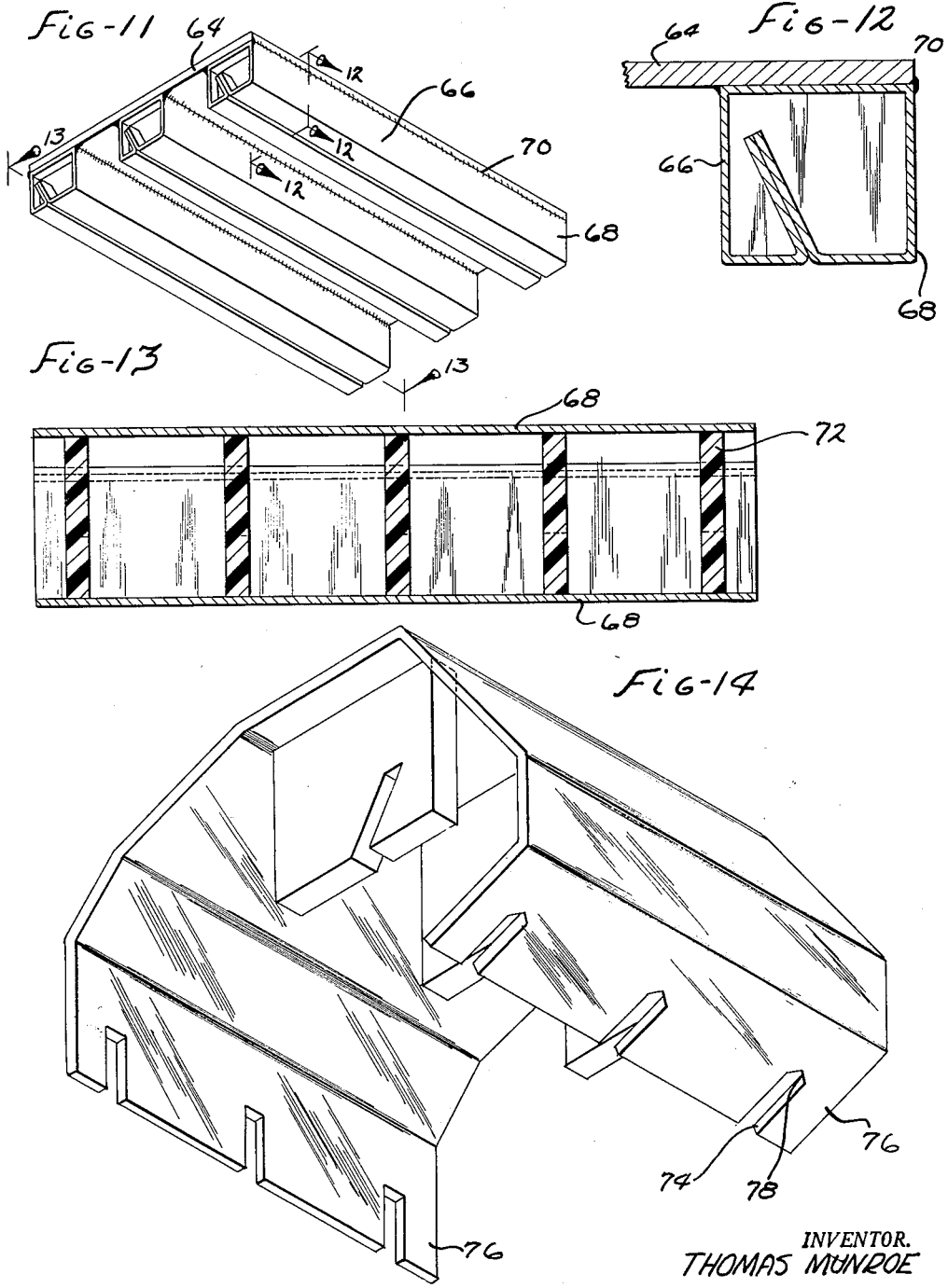

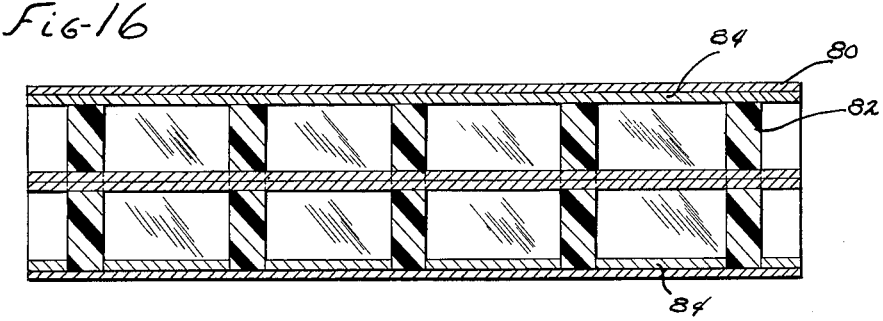
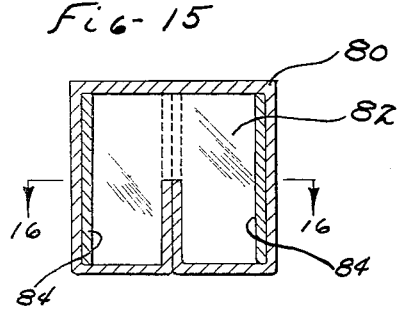
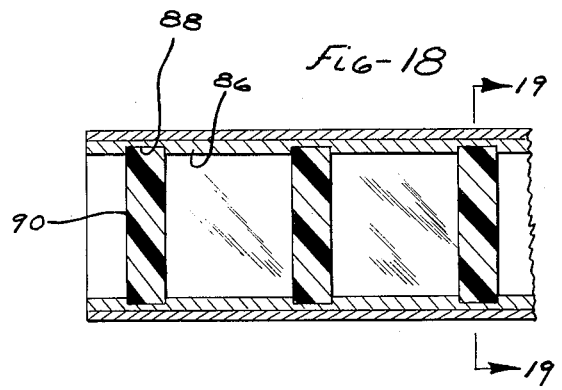
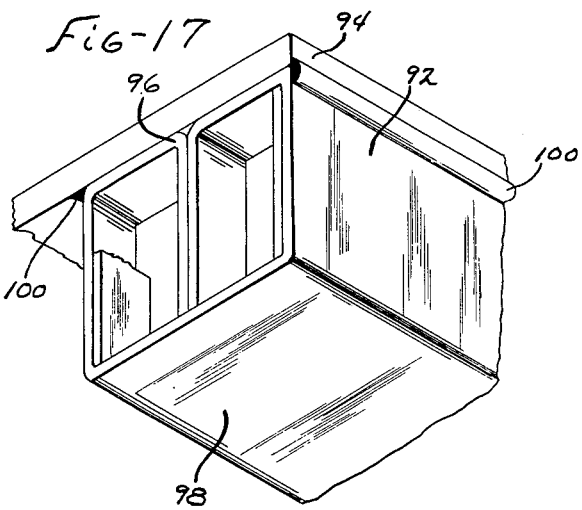
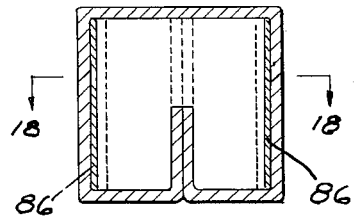

2,997,266
LEG, SKID, OR CLEAT STRUCTURE AND COMBINATION WITH PALLET SHEET
Thomas Munroe, Dayton, Ohio, assignor to Moraine Box Company, Dayton, Ohio, a corporation of Michigan
Filed Aug. 12, 1959, Ser. No. 833,205
6 Claims. (Cl. 248—120)

This invention relates to supporting legs or skids for pallets and to the combination of pallet sheets with supporting legs or skids attached thereto.

More particularly still this invention relates to a pallet comprising supporting legs or skids and to a pallet sheet having such supporting legs or skids attached thereto in which the supporting leg or skid is of a collapsible nature whereby the pallets can be shipped substantially flat.

In the handling of goods for shipment, it is customary to palletize the goods or otherwise arrange the material so that it can be handled with lift trucks and the like in order to load it on to trucks and railway cars or to transfer the material about a plant in which it is being used.

Such arrangements ordinarily require the load of material to be elevated slightly to permit the forks of a lift truck to be inserted therebeneath. This can be accomplished within a plant by the means of permanent load platforms of wood or metal, but this is not an economical procedure to employ where the goods are being shipped out of a plant as by truck or rail. In these latter instances the supporting means for the load must either be returned to the shipping point, which is an inconvenience, or must be inexpensive enough that it can be thrown away without representing any substantial loss.

Heretofore, there has been provided pallet arrangements consisting of sheets of plywood or pressed wood or cardboard having blocks secured to the underneath side thereof to form legs or skids which have been utilized as pallets. Whenever pallets of this nature are to be thrown away the legs or skids are generally made of cardboard as by rolling the cardboard up to form short tubular or generally rectangular substantially solid cardboard blocks.

Pallets of this nature are throw-away items not generally usable more than one time but are relatively expensive because considerable cardboard or corrugated paper is used in making them up.

Further, there is a definite load limitation that such a pallet can accommodate and extremely heavy loads are not adapted for being conveyed by an arrangement of this nature. Such arrangements, furthermore, are sensitive to moisture and cannot withstand abuse.

Having the foregoing in mind, it is a primary object of the present invention to provide a pallet structure, and particularly, a supporting leg or skid for a pallet sheet which realizes the advantages of throw-away pallets while at the same time avoiding the disadvantages in connection therewith.

Another object of this invention is the provision of a pallet sheet supporting leg or skid which is extremely strong and can handle even the heaviest loads but which is inexpensive enough that it can be thrown away after one use if desired.

A still further object of this invention is the provision of a pallet sheet leg or skid supporting structure so arranged that the pallet and legs or skids can be shipped in a knocked down state to a point of use and there assembled, thus saving shipping costs and space in connection with delivering the pallet and blocks.

A particular object of this invention is the provision of a supporting leg or skid for a pallet sheet constituting corrugated cardboard and wood pieces in which the wood pieces are so arranged that the full strength thereof can be developed in use thus permitting an extremely strong supporting block to be manufactured that it is relatively light and inexpensive.

A still other object of this invention is the provision of a pallet sheet supporting leg or skid which can be made up partly of scrap pieces that are to be found about a box factory or the like.

Another object of this invention is the provision of a pallet sheet supporting leg or skid and pallet sheet so constructed that the pallet sheet and supports can be shipped with the supports knocked down to a point of use and at the point of use the supports can be assembled without the use of any tools.

Still another object of this invention is the provision of a leg or skid structure for a pallet sheet or the like which lends itself to being fabricated not only of paper and wood but also from combination of other materials such as sheet metal and plastic.

These and other objects and advantages will become more apparent upon reference to the drawings in which:

FIGURE 1 is a perspective view looking up from beneath a pallet according to this invention having pallet sheet supporting skids made according to this invention;

FIGURE 2 is a sectional view indicated by line 2—2 on FIGURE 1 showing the supporting skids in cross-section;

FIGURE 3 is a diagrammatic view showing the manner in which the envelope of the skids can be folded flat against the pallet sheet by removing the wood compression members therefrom for shipping the pallet;

FIGURE 4 is a bottom plan view showing a pallet having a plurality of supporting legs according to this invention distributed thereover so that the pallet can be engaged by the forks of a lift truck from any side;

FIGURE 5 is a perspective view of the wood compression member used in the FIGURES 1 and 4 construction;

FIGURE 6 is a perspective view showing one of the support legs of FIGURE 4 being assembled;

FIGURE 7 is a perspective view showing a modified form of a supporting leg utilizing the combination of wooden compression member and a corrugated paper envelope according to this invention;

FIGURE 8 is a perspective view similar to FIGURE 6 but showing a somewhat modified form of supporting leg or block according to this invention;

FIGURE 9 is a transverse sectional view indicated by cutting plane 9—9—9 on FIGURE 8 showing the compression members being assembled with the envelope of the supporting leg or block;

FIGURE 10 is a longitudinal sectional view taken through a supporting leg or block according to this invention in which the compression members are formed of plastic and the envelope is formed of either corrugated paper or sheet metal;

FIGURE 11 is a perspective view similar to FIGURE 1 but shows supporting skids attached to the pallet sheet in which the modified form disclosed in FIGURE 8 is employed;

FIGURE 12 is a fragmentary sectional view indicated by cutting planes 12—12—12 on FIGURE 11 showing more in detail the connection of the envelope of the supporting skid with the pallet sheet and also showing how the envelope could be welded to the pallet sheet when both thereof are formed of metal;

FIGURE 13 is a longitudinal sectional view indicated by line 13—13 on FIGURE 11;

FIGURE 14 is a perspective view showing the assembling of the compression members with the envelope of the FIGURES 11 through 13 modification;

FIGURE 15 is a transverse sectional view taken through a supporting skid according to this invention showing the manner in which stiffening members could be inserted inside the envelope and along the sides of the compression members;

FIGURE 16 is a plan sectional view indicated by line 16—16 of FIGURE 15 showing the relationship between the stiffening members and the compression members within the envelope of the supporting skid;

FIGURE 17 is a fragmentary perspective view showing the manner in which the supporting legs or skids according to this invention could be attached to the pallet sheet in inverted relation relative to the manner in which they are shown in the other modifications should it be so desired;

FIGURE 18 is a sectional view indicated by line 18—18 on FIGURE 19 showing the manner in which the stiffening members inside the envelope and at the sides of the compression members could be notched out for receiving the side edges of the compression members; and FIGURE 19 is a transverse sectional view indicated by line 19—19 on FIGURE 18.

Referring to the drawings somewhat more in detail, in FIGURE 1, 10 indicates a pallet sheet which preferably consists of plywood or corrugated paper or the like depending upon the load to be imposed thereon, but which may be metal.

On the underside of the pallet is a plurality of elongated blocks or skid members 12. These members comprise an outer envelope portion 14 and a plurality of compression members 16 contained therein and spaced therealong.

The envelope portion 14 in most cases will consist of corrugated paper or boxboard but may, as will be seen in the case of pallets which are going to be subjected to considerable abuse, as for shipment on oceangoing vessels or the like, consist of metal. In cases where great security is desired as in the case of aircraft shipment the envelope could for example consist of thin aluminum. Also, in cases where considerable moisture might be encountered and which would cause the boxboard or cardboard to deteriorate rapidly, the envelope portions may be of metal. Where the envelopes are metal the pallet sheets may also be metal and the envelopes of the supporting members connected thereto as by welding, brazing, or screws or rivets. The compression members 16 will usually consist of wooden blocks but it is conceivable that these members could be formed of metal as in the case of pallets that were to be subjected to extreme loads or extreme abuse, or could be formed of plastic material where corrosion resistance is necessary.

As will be seen in FIGURE 2 the corrugated paper envelope members 14 are fixed by adhesives or are stapled or otherwise attached to pallet sheet 10, as at 18, and consist of the portion attached to the pallet sheet, side walls 20, the portions at 22 forming the bottom wall, and the portions at 24 which are formed upwardly in the center of the channel that is formed by the corrugated paper member when it is closed about the compression member. These last mentioned portions 24 are adapted for entering notches 26 in the wood blocks 16. These notches extend half way through the wood blocks whereas the portions 24 extend completely to the underside of the portion of the corrugated paper that is attached to the bottom of he pallet paper.

The parts of portions 24 extending past the bottom of notches 26 of the wood members 16 are themselves notched to receive the wood members. By this arrangement the wood members are supported in a vertical position and in predetermined locations beneath the pallet sheet so as to be in compression when the pallet sheet is loaded.

This provides extremely strong support for the pallet sheet so distributed beneath the pallet sheet that very heavy loads can be imposed thereon.

At the same time, the corrugated paper portions 14 can be attached to the pallet sheet and folded substantially flat thereagainst as indicated at 28 in FIGURE 3 so that the pallet sheet can be shipped substantially flat.

At the point of use, the wood blocks can be put in place and the corrugated paper portions folded therein as indicated in FIGURES 1 and 2 and the pallet sheet is then ready for use.

If the pallet sheet is to be returned it can again be knocked down and shipped back, but in most cases the pallet sheet and the supporting legs or skids will form a throw-away item.

Although it is not necessary to do so, the wood blocks 16 and the corrugated paper 14 could be secured together by adhesive or nails or staples if so desired.

The structure described above has utilized corrugated paper or boxboard for the envelope and wood for the compression members. It is to be understood however that in this modification, as well as in modifications subsequently to be described, the envelope could consist of any flexible material having a degree of stiffness. Thus, relatively thin metal sheet, such as aluminum or steel could be employed for the envelope portion. Also, while wood is preferred as the compression members, and will, in most cases, be satisfactory regardless of the material of the envelope, it is conceivable that in extreme circumstances the compression members could be formed of metal and in still other cases, particularly where corrosion is a problem, the supporting compression members could be formed of a plastic material, or of a wood or steel or other metal coated with a corrosion resistant plastic such as a polyethylene or epoxy resin.

Where it is desired for the pallet sheet to be of the type that a lift truck can approach from any side, the arrangement of FIGURES 4, 5, and 6 is employed wherein pallet sheet 30 has a plurality of individual legs 32 attached to the underside, each leg representing a short skid of the same nature as the skids of FIGURE 1, except that space is provided between the legs for the forks of a lift truck.

FIGURE 7 illustrates another manner in which the combination of a flexible envelope and compression members could be utilized for forming an inexpensive but extremely strong pallet support leg. In this figure the pallet blocks comprise wood members 40 and an intermediate wood member 42 extending therebetween and engaging grooves 41 in the end members.

A corrugated paper wrapper 46 is wrapped around the peripheries of the blocks and may be attached thereby by adhesive 48 or by nails or staples 50 or the corrugated paper could be turned into slotted portions in the end members 40 similarly to the previously described modifications whereby the envelope of the FIGURE 7 could be attached to a pallet sheet and the legs assembled at a point of use.

In any case the arrangement of the present invention provides an extremely convenient manner of providing a pallet sheet with distributed extremely strong supporting legs or skids which can be shipped knocked down from a point of manufacture to a point of use.

In the modification of FIGURE 8 the leg, or portion of a skid illustrated comprises the outer envelope 52 within which is located the supporting compression members 54. As will be seen in FIGURE 9, the supporting compression members are characterized in that the slot portion 56 therein that receives the end flaps of the evelope portion is inclined at an angle to the vertical axis of the compression members. By means of this arrangement the supporting compression members are very easy to assemble with the enclosing envelope due to the fact that the last flap portion to be inserted in the slot, such flap portion being indicated at 58 in FIGURE 9, will enter the receiving slot 56 much more readily than in the case of the previously described modifications where the corresponding slot is located in the center of the compression member and extends vertically therein.

From the arrangement of FIGURES 8 and 9 it will be evident that it will be particularly useful where the envelope is of metal and is relatively stiff and cannot be manipulated with the same readiness as the cardboard or boxboard of the previously described modifications.

It will also be apparent that where a metal envelope is employed for the supporting leg or skid, it would preferably be scored along the lines where it is to be bent so it can more readily be folded about the compression members.

In FIGURE 10 there is shown a modification in which the envelope 60 of the supporting leg or skid is formed of metal whereas the compression members, indicated at 62, are formed of a plastic material or a wood impregnated with plastic. This gives a highly corrosive resistant and extremely strong supporting structure according to the present invention.

FIGURE 11 illustrates an arrangement wherein a pallet sheet 64 is provided with skids 66 of the same general construction as illustrated in FIGURES 8 and 9. This figure also illustrates that the envelope 68 of the supporting skids or legs could be welded as at 70 to pallet sheet or bolted thereto when they are of a metal that can be so joined together. It will be understood that the modification of FIGURES 8, 9 and 11 also has the same advantages in connection with corrugated paper and wood as in connection with metal or plastic materials.

FIGURE 13 shows a longitudinal section through a skid of the FIGURE 11 modification and indicates that the compression members or blocks extend transversely of the skids and may be formed of plastic as indicated at 72.

FIGURE 14 is a perspective view showing how the envelope of the FIGURES 11 through 13 modification is wrapped around and assembled with the compression members. This view also illustrates that the notches 74 in the one flap 76 of the envelope are provided with V shaped inner ends 78, or have some other characteristic configuration so that it will be evident to the assembler which one of the flaps 76 is to be inserted first into the notches of the compression members.

Referring now to FIGURES 15 and 16, there is shown therein a modified arrangement wherein the envelope 80 is wrapped around the compression members 82 in any of the manners heretofore described but wherein stiffening members 84 are provided extending along the inside of the envelope at the sides of the compression members for stiffening the assembly.

FIGURE 18 shows a modification wherein the stiffening members 86 are provided with notches 88 for receiving the edge parts of the compression members 90 so that the compression members are accurately located.

FIGURE 17 shows an arrangement wherein the leg or skid 92 is attached to the pallet sheet 94 in inverted relation thereto and with there being lines of welding at 100 joining the envelope to the pallet sheet.

FIGURE 19 is a cross section indicated by line 19—19 on FIGURE 18 and shows how the compression members are supported at their side edges by the stiffening members 86.

It will be understood that this invention is susceptible to modification in order to adapt it to different usages and conditions; and, accordingly, it is desired to comprehend such modifications within this invention as may fall within the scope of the appended claims.

I claim:

1. A support leg or skid especially adapted for use with a pallet sheet or the like comprising; a thin rectangular sheet forming an envelope member, said sheet being folded into a tubular form rectangular in cross-section and with the side marginal edges of the sheet extending inwardly of the tube from about the center of one side, and rectangular block means of rigid material and of substantial thickness forming compression members on edge within the tube and slotted to closely receive the said marginal edge portions of the sheet, said marginal edge portions of the sheet extending completely across the tube to the other side thereof, and said edge portions being slotted and closely receiving the unslotted portion of said block means, there being at least two of the block means arranged in spaced relation within the tube, the slots in said block means being inclined at an angle to the central axis of the block means to facilitate assembly of the block means with the envelope.

2. A support leg or skid especially adapted for use with a pallet sheet or the like comprising; a thin rectangular sheet forming an envelope member, said sheet being folded into a tubular form rectangular in cross-section and with the side marginal edges of the sheet extending inwardly of the tube from about the center of one side, and rectangular block means of rigid material and of substantial thickness forming compression members on edge within the tube and slotted to closely receive the said marginal edge portions of the sheet, said marginal edge portions of the sheet extending completely across the tube to the other side thereof, and said edge portions being slotted and closely receiving the unslotted portion of said block means, there being at least two of the block means arranged in spaced relation within the tube, the slots in said block means being displaced from the center lines of the block means and being inclined at an angle to the central axis of the block means to facilitate assembly of the block means with the envelope, and the slots in one of the marginal edge portions of the sheet having a configuration different from the slots in the other edge portion of the sheet to give an indication of the proper orientation of the block means and envelope prior to assembly, said sheet being scored along lines parallel to the side edges where the sheet is to be bent to form the envelope member.

3. In combination; a support leg or skid especially adapted for use with a pallet sheet or the like comprising; a thin rectangular corrugated sheet forming an envelope member folded into a tubular form rectangular in cross-section and with the side marginal edges of the sheet extending inwardly of the tube from about the center of one side, and rigid rectangular block means of substantial thickness forming compression members extending within and closely fitting the tube, said block means being slotted and receiving the said marginal edge portions of the sheet, said marginal edge portions of the corrugated sheet extending completely across the tube to the other side thereof, and said edge portions being slotted and closely receiving the unslotted portion of said block means, there being at least two of the block means arranged in spaced relation within the tube, there being a pallet sheet secured to the side of said tube opposite the said turned in marginal portions so the support legs can be assembled at a point of use.

4. In combination; a pallet sheet, a plurality of corrugated paper members secured in the center region of each to the underneath side of said pallet sheet, each said corrugated paper member being scored and formed into a tube with the marginal portions of the sheet and which are not secured to said pallet sheet extending inwardly of the tube from about the middle of the lower side of the tube and in face to face relation, and plurality of relatively thin wood blocks fitted closely within the tube and disposed therein in spaced relation and on edge relative to the pallet, said blocks being notched about half through the bottom and closely receiving the marginal portions of the sheet.

5. A skid support for use with a pallet sheet comprising a thin rectangular sheet providing an envelope member folded into a tubular shape which is rectangular in cross-section and with the side marginal edges of the sheet extending inwardly of the tube from the center of one side, and rectangular block means of rigid material and of substantial thickness for compression members on edge within the tube, said compression members being slotted and receiving said marginal edge portions of the sheet, said marginal edge portions of the sheet extending completely across said tube to the other side thereof, said edge portions being slotted and engaging the unslotted portion of said block means and there being at least two of the block means arranged in spaced relation with said tube with the slots in said block means being offset from the center lines of the block means and being inclined at an angle to the central axis of the block whereby to facilitate assembly of the block means with said envelope, said slots in one of the marginal edge portions of the sheet having a configuration different from the slots in the other edge portion of the sheet whereby the proper orientation of the block means and envelope is indicated to facilitate assembly, said sheet being scored along lines parallel to the side edges thereof to facilitate the forming of said envelope member.

6. A skid support for use with a pallet sheet comprising a thin rectangular sheet providing an envelope member folded into a tubular shape which is rectangular in cross-section and with the side marginal edges of the sheet extending inwardly of the tube from the center of one side, and rectangular block means of rigid material and of substantial thickness for compression members on edge within the tube spaced longitudinally of said support, said compression members being slotted and receiving said marginal edge portions of the sheet, said marginal edge portions of the sheet extending across said tube to the other side thereof, said edge portions comprising slots engaging the unslotted portion of said block means, said slots in said block means being offset from the center lines of the blade means and being inclined at an angle to the central axis of the block to thereby facilitate assembly of the block means with said envelope, said slots in one of the marginal edge portions of the sheet having a configuration different from the slots in the other edge portion of the sheet whereby the proper orientation of the block means and envelope is indicated to facilitate assembly, said sheet being scored along lines parallel to the side edges thereof to facilitate the forming of said envelope member.

References Cited in the file of this patent
UNITED STATES PATENTS

| | | |
|---|---|---|
| 1,449,468 | Walter | Mar. 27, 1923 |
| 2,503,240 | Cahners | Apr. 11, 1950 |
| 2,593,895 | Kohl | Apr. 22, 1952 |
| 2,611,569 | Coleman | Sept. 23, 1952 |
| 2,904,297 | Hamilton | Sept. 15, 1959 |

FOREIGN PATENTS

| | | |
|---|---|---|
| 78,122 | Norway | May 27, 1949 |